United States Patent [19]

Van Loosdregt

[11] Patent Number: 4,748,374
[45] Date of Patent: May 31, 1988

[54] LUMINESCENT RARE EARTH METAL PHOSPHATE, LUMINESCENT SCREEN PROVIDED WITH SUCH A PHOSPHATE AND LOW-PRESSURE MERCURY VAPOR DISCHARGE LAMP PROVIDED WITH SUCH A SCREEN

[75] Inventor: Peter C. Van Loosdregt, Eindhoven, Netherlands

[73] Assignee: U.S. Philips Corporation, New York, N.Y.

[21] Appl. No.: 109,793

[22] Filed: Oct. 16, 1987

[30] Foreign Application Priority Data

Oct. 20, 1986 [NL] Netherlands ..................... 8602627

[51] Int. Cl.$^4$ ............................................ C09K 11/475
[52] U.S. Cl. .............................. 313/486; 252/301.4 P; 428/690
[58] Field of Search ................. 252/301.4 P; 313/486; 428/690

[56] References Cited

U.S. PATENT DOCUMENTS

| | | | |
|---|---|---|---|
| 3,211,666 | 10/1965 | McAllister | 252/301.4 P |
| 3,481,884 | 12/1969 | Palilla et al. | 252/301.4 P |
| 3,488,292 | 1/1970 | McAllister | 252/301.4 P |
| 3,539,857 | 11/1970 | Shaffer | 252/301.4 P |
| 3,600,324 | 8/1971 | Bril et al. | 252/301.4 P |
| 3,634,282 | 1/1972 | Denis et al. | 252/301.4 P |
| 3,925,674 | 12/1975 | D'Silva et al. | 252/301.4 P |
| 4,423,349 | 12/1983 | Nakajima et al. | 252/301.4 P |

FOREIGN PATENT DOCUMENTS 52-75673  6/1977  Japan ........................... 252/301.4 P Primary Examiner—Jack Cooper
Attorney, Agent, or Firm—John C. Fox

[57] ABSTRACT

Luminescent rare earth metal phosphate defined by the formula

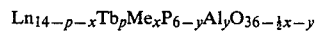

$$Ln_{14-p-x}Tb_pMe_xP_{6-y}Al_yO_{36-\frac{1}{2}x-y}$$

wherein Ln is yttrium which may be replaced up to 50 mol % by Gd and/or La, wherein Me is at least one of the elements Ca, Sr and Ba, and wherein $0 \leq x \leq 3$, $0 \leq y \leq 1.5$ and $0.1 \leq p \leq 4$ is disclosed. The phosphate is useful in a luminescent screen and low-pressure mercury vapor discharge lamp provided with such a screen.

7 Claims, 1 Drawing Sheet

LUMINESCENT RARE EARTH METAL PHOSPHATE, LUMINESCENT SCREEN PROVIDED WITH SUCH A PHOSPHATE AND LOW-PRESSURE MERCURY VAPOR DISCHARGE LAMP PROVIDED WITH SUCH A SCREEN

BACKGROUND OF THE INVENTION

The invention relates to a luminescent rare earth metal phosphate, which is activated by terbium. The invention also relates to a luminescent screen provided with such a phosphate and to a low-pressure mercury vapour discharge lamp provided with such a screen.

$Tb^{3+}$-activated phosphates of rare earth metals, notably those of Y and/or La are known to be very efficient luminescent materials. See, for example, U.S. Pat. Nos. 3,634,282; 3,403,279 and 3,211,666. The materials described in these United States Patents have the orthophosphate of La and/or Y, for example, $LaPO_4$ as the fundamental lattice.

A drawback of these known luminescent phosphates is that they have to be activated not only by Tb but also by Ce. In fact, the Ce is necessary to absorb the exciting radiation, whereafter the excitation energy is transferred to the Tb. Therefore it is unavoidable that these known phosphates generally also exhibit short-wave Ce emission which is unusable.

The object of the invention is to provide novel efficiently luminescent materials in which Ce or another ion which can absorb the exciting radiation is not necessary, so that the emitted radiation is a pure $Tb^{3+}$ emission.

SUMMARY OF THE INVENTION

According to the invention a luminescent phosphate as mentioned in the opening paragraph is characterized in that the phosphate is an oxyphosphate and is defined by the formula

$Ln_{14-p-x}Tb_pMe_xP_{6-y}Al_yO_{36-\frac{1}{2}x-y}$ wherein Ln is yttrium, which may be replaced up to 50 mol% by Gd and/or La, wherein and Me is at least one of the elements Ca, Sr and Ba, and wherein $0 \leq x \leq 3$, $0 \leq y \leq 1.5$ and $0.1 \leq p \leq 4$.

A luminescent phosphate according to the invention has an oxyphosphate as the fundamental lattice, that is to say, the rear earth metal-phosphorus ratio Ln/P>1. Such crystal lattices are known per se. See, for example, Rev. Int. hautes Temp. 15, 287 (1978) in which inter alia $Ln_{14}P_6O_{36}$ is described. However, in accordance with the invention, it has been found that such lattices yield very efficiently luminescing material upon activation by $Tb^{3+}$. Furthermore it has been found that the above-mentioned known lattices can be modified. The rare earth metal can in fact be replaced partly by Ca, Sr and/or Ba. However, in the formula of the phosphate, no more than 3 of the 14 rare earth metal atoms are then to be replaced by the said alkaline earth metal atoms in order to maintain an efficient luminescence. It has also been found that in these oxyphosphates the phosphorus can be partly replaced by Al. No more than 1.5 of the 6 phosphorus atoms are then replaced by Al in the formula. It is also possible to replace the rare earth metal Y up to 50 mol.% by Gd and/or La in $Y_{14}P_6O_{36}$ while maintaining the satisfactory properties of luminescence.

It has been found that in a luminescent phosphate according to the invention an absorbing ion such as Ce is not necessary. Efficient $Tb^{3+}$ emission is obtained by addition of Tb only. The Tb concentration p is chosen to be between 0.1 and 4. If the Tb concentration is too low (p<0.1), the absorption of the exciting radiation (for example, 254 nm) is too small. However, at a too high Tb concentration (p>4) disturbing concentration quenching occurs so that a too low quantum efficiency is achieved.

An advantageous embodiment of a luminescent phosphate according to the invention is characterized in that the phosphate is defined by the formula

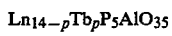

$Ln_{14-p}Tb_pP_5AlO_{35}$ wherein Ln is yttrium, which may be replaced up to 50 mol% by Gd and/or La and wherein $0.1 \leq p \leq 4$. It has been found that the phosphate phase in which 1 out of the 6 phosphorus atoms is replaced by an Al atom gives rise to very efficiently luminescing materials.

Phosphates in accordance with the above-mentioned embodiment in which $0.7 \leq p \leq 2.5$ are preferred.

A second advantageous embodiment of a luminescent phosphate according to the invention is characterized in that the phosphate is defined by the formula

$Y_{12-p}Tb_pMe_2P_6O_{35}$ wherein Me is at least one of the elements Ca, Sr and Ba and wherein $0.1 \leq p \leq 4$. It has been found that the phosphate phase in which 2 out of the 14 rare earth metal atoms, notably Y atoms, are replaced by alkaline earth metal atoms, luminesces very efficiently.

In the latter embodiment, Tb concentrations p satisfying $0.7 \leq p \leq 2.5$ are preferred.

BRIEF DESCRIPTION OF THE DRAWINGS

Embodiments of luminescent phosphates according to the invention, suitable for a luminescent screen will now be described in greater detail with reference to the accompanying drawing and a number of examples of preparation.

In the drawing.

DESCRIPTION OF THE PREFERRED EMBODIMENTS

Figure 1:
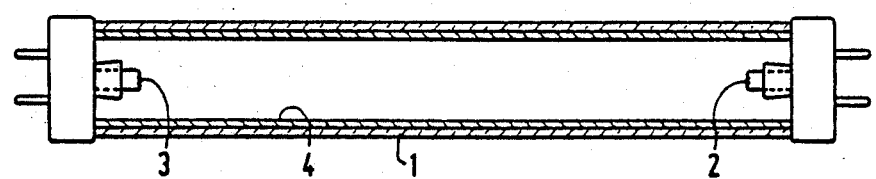
FIG. 1 shows a low-pressure mercury vapour discharge lamp provided with a luminescent screen comprising a $Tb^{3+}$-activated phosphate according to the invention.

FIG. 1 shows diagrammatically in cross-section a low-pressure mercury vapour discharge lamp having a tubular glass wall 1. Electrodes 2 and 3, between which the discharge is maintained during operation, are placed at the ends of the lamp. The lamp has a small quantity of mercury and a rear gas as a starter gas. Luminescent layer 4 comprising a luminescent phosphate according to the invention, is supported by wall 1 and constitutes a luminescent screen. The layer 4 may be provided in a conventional manner on the wall 1, for example, by means of a suspension comprising the luminescent material.

EXAMPLE 1

A mixture was made of 1.448 g of $Tb_4O_7$
6.415 g of $Y_2O_3$
0.274 g of $Al_2O_3$
3.553 g of $(NH_4)_2HPO_4$
1.951 g of $Gd_2O_3$.

Figure 2:
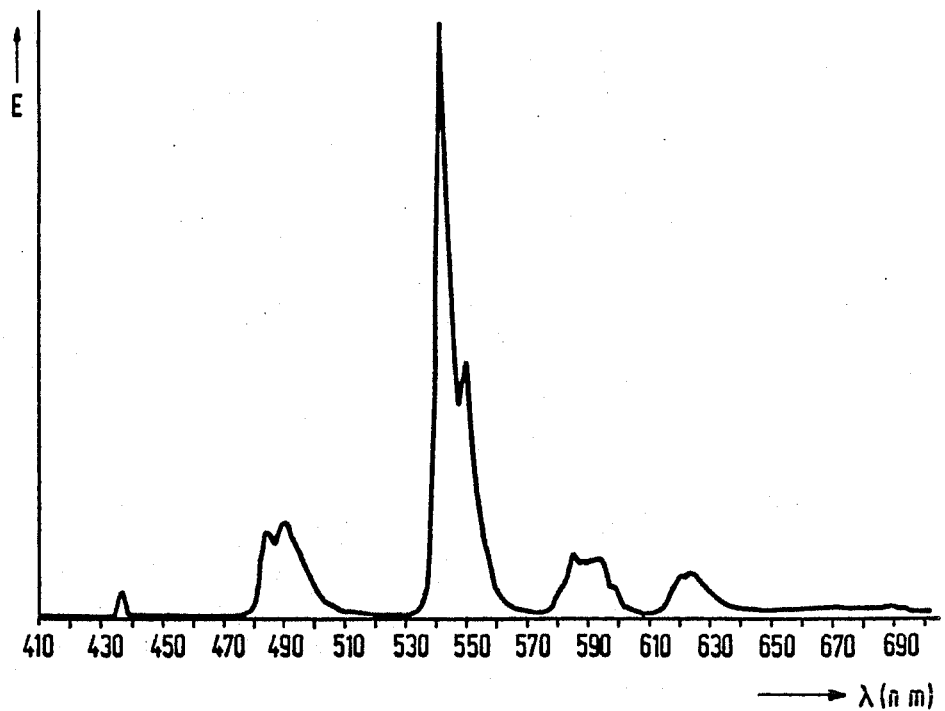
FIG. 2 shows the spectral energy distribution of the emission of a $Tb^{3+}$-activated phosphate according to the invention.

This mixture was fired in air at 700° C. for 1 hour. The product obtained was subjected to a second firing treatment for 4 hours in a weakly reducing atmosphere ($N_2$ with 5% by volume of $H_2$) at 1600° C. After cooling, a $Tb^{3+}$-activated rare earth metal phosphate defined by the formula $$Y_{10.56}Gd_2Tb_{1.44}P_5AlO_{35}$$

was obtained. Upon excitation by short-wave ultraviolet radiation (predominantly 254 nm) the material exhibited the characteristic Tb emission. Such a Tb emission is shown in FIG. 2. The wavelength λ is plotted in nm on the horizontal axis and the relative radiation intensity E is plotted in arbitrary units on the vertical axis. This phosphate had a quantum efficiency (q) of 74%, whereas the absorption (A) of the exciting radiation (254 nm) was 89%.

EXAMPLES 2 TO 8

In a manner analogous to that described in Example 1, a number of $Tb^{3+}$-activated phosphates with different compositions according to the invention were obtained. The formulae of these materials, as well as the results of the measurements of the quantum efficiency (q in %) and the absorption (A in %) of the exciting 254 nm radiation, are summarized in Table 1.

TABLE 1

| Example | Formula | q (%) | A (%) |
|---|---|---|---|
| 1 | $Y_{10.56}Gd_2Tb_{1.44}P_5AlO_{35}$ | 74 | 89 |
| 2 | $Y_{8.6}Gd_4Tb_{1.4}P_5AlO_{35}$ | 70 | 87 |
| 3 | $Y_{5.6}Gd_7Tb_{1.4}P_5AlO_{35}$ | 69 | 86 |
| 4 | $Y_{10.56}La_2Tb_{1.44}P_5AlO_{35}$ | 64 | 89 |
| 5 | $Y_{8.6}La_4Tb_{1.4}P_5AlO_{35}$ | 43 | 95 |
| 6 | $Y_{5.6}La_7Tb_{1.4}P_5AlO_{35}$ | 50 | 91 |
| 7 | $Y_{12.6}Tb_{1.4}P_6O_{36}$ | 73 | 87 |
| 8 | $Y_{10.8}Gd_2Tb_{1.2}P_6O_{36}$ | 71 | 82 |

EXAMPLES 9 TO 12

In a manner analogous to that described with reference to Example 1, a number of phosphates defined by the formula $$Y_{14-p}Tb_pP_5AlO_{35}$$

were obtained with different Tb concentrations. The formulae of these materials, as well as the quantum efficiency (q) and the absorption (A) of the exciting 254 nm radiation are summarized in Table 2.

TABLE 2

| Example | Formula | q (%) | A (%) |
|---|---|---|---|
| 9 | $Y_{13.3}Tb_{0.7}P_5AlO_{35}$ | 77 | 85 |
| 10 | $Y_{12.6}Tb_{1.4}P_5AlO_{35}$ | 80 | 90 |
| 11 | $Y_{11.9}Tb_{2.1}P_5AlO_{35}$ | 76 | 92 |
| 12 | $Y_{11.2}Tb_{2.8}P_5AlO_{35}$ | 65 | 93 |

EXAMPLES 13 TO 15

In a manner analogous to that described with reference to Example 1, a number of phosphates defined by the formula $$Y_{10.8}Tb_{1.2}Me_2P_6O_{35}$$

were obtained, with Me being equal to Ca, Sr or Ba. The formulae of these materials as well as the quantum efficiency (q) and the absorption (A) of the exciting 254 nm radiation are summarized in Table 3.

TABLE 3

| Example | Formula | q (%) | A (%) |
|---|---|---|---|
| 13 | $Y_{10.8}Tb_{1.2}Ca_2P_6O_{35}$ | 91 | 84 |
| 14 | $Y_{10.8}Tb_{1.2}Sr_2P_6O_{35}$ | 92 | 87 |
| 15 | $Y_{10.8}Tb_{1.2}Ba_2P_6O_{35}$ | 85 | 88 |

Low-pressure mercury vapour discharge lamps of the 36 W type and with different coating weights, namely 4.53 and 3.25 g/tube, were obtained with the material in accordance with Example 13 ($Y_{10.8}Tb_{1.2}Ca_2P_6O_{35}$). Furthermore such lamps were made with the material in accordance with Example 10 ($Y_{12.6}Tb_{1.4}P_5AlO_{35}$). The following Table 4 shows the results of the measurements of the luminous flux (1 m) for these lamps, both initially (0 hr) and after 100 hrs of operation. In addition, luminous flux at 0 hr as a percent of luminous flux at 100 hrs is given.

TABLE 4

| Phosphor | Coating weight (g/tube) | 0 hr | | 100 hrs | |
|---|---|---|---|---|---|
| | | 1 m | % | 1 m | % |
| $Y_{10.8}Tb_{1.2}Ca_2P_6O_{35}$ | 4.53 | 4052 | 102.6 | 3950 | 100 |
| $Y_{10.8}Tb_{1.2}Ca_2P_6O_{35}$ | 3.25 | 4056 | 103.1 | 3935 | 100 |
| $Y_{12.6}Tb_{1.4}P_5AlO_{35}$ | | 3440 | 105 | 3279 | 100* |

*At 1000 hrs 93% and at 2000 hrs 88%.

What is claimed is:

1. A luminescent rear earth metal phosphate which is activated by $Tb^{3+}$ and exhibits a high quantum efficiency when excited by 254 nm radiation, characterized in that the phosphate is an oxyphosphate and is defined by the formula $$Ln_{14-p-x}Tb_pMe_xP_{6-y}Al_yO_{36-\frac{1}{2}x-y}$$

wherein Ln is yttrium which is replaceable by up to 50 mol% by Gd and/or La, wherein Me is at least one of the elements Ca, Sr and Ba and wherein $0 \leq x \leq 3$, $0 \leq y \leq 1.5$ and $0.1 \leq p \leq 4$.

2. A luminescent phosphate as claimed in claim 1, characterized in that the phosphate is defined by the formula $$Ln_{14-p}Tb_pP_5AlO_{35}.$$

3. A luminescent phosphate as claimed in claim 2, characterized in that $0.7 \leq p \leq 2.5$.

4. A luminescent phosphate as claimed in claim 1, characterized in that the phosphate is defined by the formula $$Y_{12-p}Tb_pMe_2P_6O_{35}.$$

5. A luminescent phosphate as claimed in claim 4, characterized in that $0.7 \leq p \leq 2.5$ 6. A luminescent screen having a luminescent layer provided on a support, which layer comprises a luminescent rare earth metal phosphate as claimed in claim 1.

7. A low-pressure mercury vapour discharge lamp provided with a luminescent screen as claimed in claim 6.

* * * * *